United States Patent [19]

Girardier et al.

[11] Patent Number: 4,821,421

[45] Date of Patent: Apr. 18, 1989

[54] MICROMETER FOR MEASURING OUTER DIMENSIONS INNER DIMENSIONS OF A CAVITY OR DEPTH OF A CAVITY

[76] Inventors: Jean-Pierre Girardier; Raymond Girardier, Both of 1411, Vaugondry, Switzerland

[21] Appl. No.: 57,925

[22] PCT Filed: Sep. 18, 1986

[86] PCT No.: PCT/CH86/00131
§ 371 Date: May 14, 1987
§ 102(e) Date: May 14, 1987

[87] PCT Pub. No.: WO87/01797
PCT Pub. Date: Mar. 26, 1987

[30] Foreign Application Priority Data

Sep. 19, 1985 [FR] France ................... 85 14038

[51] Int. Cl.⁴ .............................................. G01B 5/12
[52] U.S. Cl. ....................................... 33/819; 33/813; 33/784

[58] Field of Search ............ 33/147 F, 147 R, 147 N, 33/143 R, 143 L, 166, 164 D, 167, 147 J

[56] References Cited

U.S. PATENT DOCUMENTS

| 2,561,534 | 7/1951 | Parker et al. ............. | 33/147 N |
| 3,222,790 | 12/1965 | Meyer ....................... | 33/166 |
| 3,226,833 | 1/1966 | Lemelson ................. | 33/166 X |
| 4,335,516 | 6/1982 | Edelstein ................. | 33/166 X |
| 4,385,446 | 5/1983 | Roch et al. .............. | 33/147 F X |
| 4,536,963 | 8/1985 | Yamamoto et al. ..... | 33/166 |

*Primary Examiner*—William D. Martin, Jr.
*Attorney, Agent, or Firm*—Frost & Jacobs

[57] ABSTRACT

The apparatus according to the invention essentially comprises a pistol-shaped body provided with a trigger connected to a mobile carriage carrying a piston. A measuring piece may be adapted to a fixing head provided with a surface plate constituting a reference surface. A pressure spring connected to a slide ensures the displacement of the carriage and the piston, to act upon a sliding rod accomodated within the measuring piece.

12 Claims, 5 Drawing Sheets

MICROMETER FOR MEASURING OUTER DIMENSIONS INNER DIMENSIONS OF A CAVITY OR DEPTH OF A CAVITY

BACKGROUND OF THE INVENTION

The present invention relates to a micrometer with digital readout including a body containing measuring components and carrying means for displaying the results of the measurements, this body being equipped with a head arranged to receive a measuring piece adapted for the measurement of either the outer dimensions of a surface, or of the inner dimensions of a cavity or a bore, or of depths.

Known micrometers of this type generally include a series of measuring pieces each corresponding to a determined range of dimensions and each associated with a reference ring. These devices are usually without a device for mechanical zero setting and for that reason do not in general allow a direct measurement of parts to be effected, but only allow an indirect measurement with reference to the corresponding reference rings. The real dimension of the parts is only accessible by display of the reference value. A calculation, in general an addition, consisting in adding the dimension of the reference ring to the value displayed on the display device of the micrometer allows the measurement to be determined. This operation complicates the measurement or at least renders it less easy and may, in certain cases, constitute a source of errors.

SUMMARY OF THE INVENTION

It is proposed in the present invention to meet these drawbacks by making a micrometer with numerical display as previously mentioned which permits to directly obtain, by numerical display, the real value of the dimensions of an object to be measured. A certain number of concepts, which constitute the principal features of the present invention, have been adopted to permit effecting extremely precise measurements, of the order of a micron and rendering these measurements particularly easy and indefinitely repeatable.

To this end, the micrometer according to the invention is characterized in that it includes means allowing the measurements to be effected in natural size and to display a value corresponding to the real dimension of the measured object.

According to a preferred embodiment, said means comprise a surface plate serving as a reference surface designed to constitute a fixed support for a measuring piece adapted to a fixing head solid with the body of the apparatus, this surface plate comprising two series of serrations respectively parallel to two mutually perpendicular diameters.

According to a particularly advantageous embodiment, said means comprise a fastening device of the bayonet type for fastening a measuring piece to the fixing head. This mode of fastening necessitates a rotary displacement of the measuring piece on the surface plate, which allows the elimination of dust susceptible to vitiate the measurements.

To allow zero setting of the device before each measurement, said means preferably comprise a calibrating stop solid with a mobile piston, this piston being adapted to push back a drive rod of the measuring feelers of a measuring piece, and a reference stop, these two stops being positioned in such a manner that they determine with great precision the origin of any displacement of the piston.

According to a particularly advantageous embodiment, the distance between the surface plate and the reference stop is defined with a precision of the order of 1 micron.

In order to permit a direct reading of the measured values, each measuring piece includes a drive rod having an end which is adapted to come into contact with a bearing stop solid with the free end of the piston and is positioned at a determined distance from the calibrating stop, when the measuring piece is in place on the surface plate, this distance being defined for each measuring piece in such a manner that the displacement effected by the piston from its initial position defined by its calibrating stop to its final position corresponds exactly to the dimension to be measured.

The reference stop is preferably mobile and consists of a pin sliding in a fixed sleeve carrying a control button adapted to bring this pin into a depressed position in which it serves as a support for the calibrating stop, a return spring tending to bring it back into its initial position.

According to a preferred embodiment, the piston is solid with a mobile carriage connected to a spring drive mechanism adapted to produce the displacement of said carriage.

The drive mechanism preferably includes a slide, a pressure spring adapted to produce the displacement of this slide, a stop engaged in a block solid with a trigger itself solid with the carriage, and a brake mechanism adapted to constitute an antirecoil device.

The brake mechanism advantageously includes a cylindrical rod provided with a conical section extended by a cylindrical section of constricted cross-section forming a peripheral groove disposed facing a series of orificies on the same generating line of a sleeve surrounding said cylindrical rod, these orifices containing small balls. The cylindrical rod may be axially displaced within the sleeve due to the action of a spring towards a position wherein the balls are free and in the opposite direction by the carriage towards a position wherein the balls are locked by the conical section.

The mobile piston is preferably extended by a threaded rod, this rod being associated with a drive mechanism with power reserve, adapted to axially displace this rod.

This drive mechanism with power reserve advantageously includes an electric motor, a barrel spring, mechanical means for coupling said threaded rod to said electric motor via said barrel spring, means for loading said spring and means for restituting to said threaded rod the power stored by this spring.

According to a preferred embodiment, the mechanical means for coupling said threaded rod to said motor, the means for loading said spring and the means for restituting the stored power comprise a hollow spindle rotatably driven by a helicoidal wheel which meshes with an endless screw solid with the drive shaft of the motor, an adjuster coaxial with the hollow spindle, a barrel housing and a rotary nut screwed onto said threaded rod, and further comprise a driver solid and coaxial with the hollow spindle and adapted to be made solid with the housing of the barrel spring, said spring being fixed at one end to the adjuster and at its other end to the driver.

BRIEF DESCRIPTION OF THE DRAWINGS

The present invention may be better understood with reference to the description of an example of an embodiment and to the accompanying drawings wherein.

DETAILED DESCRIPTION

Figure 1:
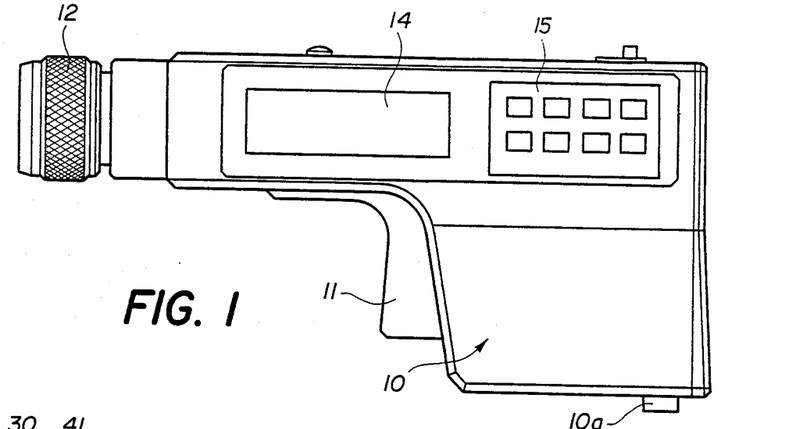
FIG. 1 represents a plan view of a preferred embodiment of the micrometer according to the invention.
Figure 4:
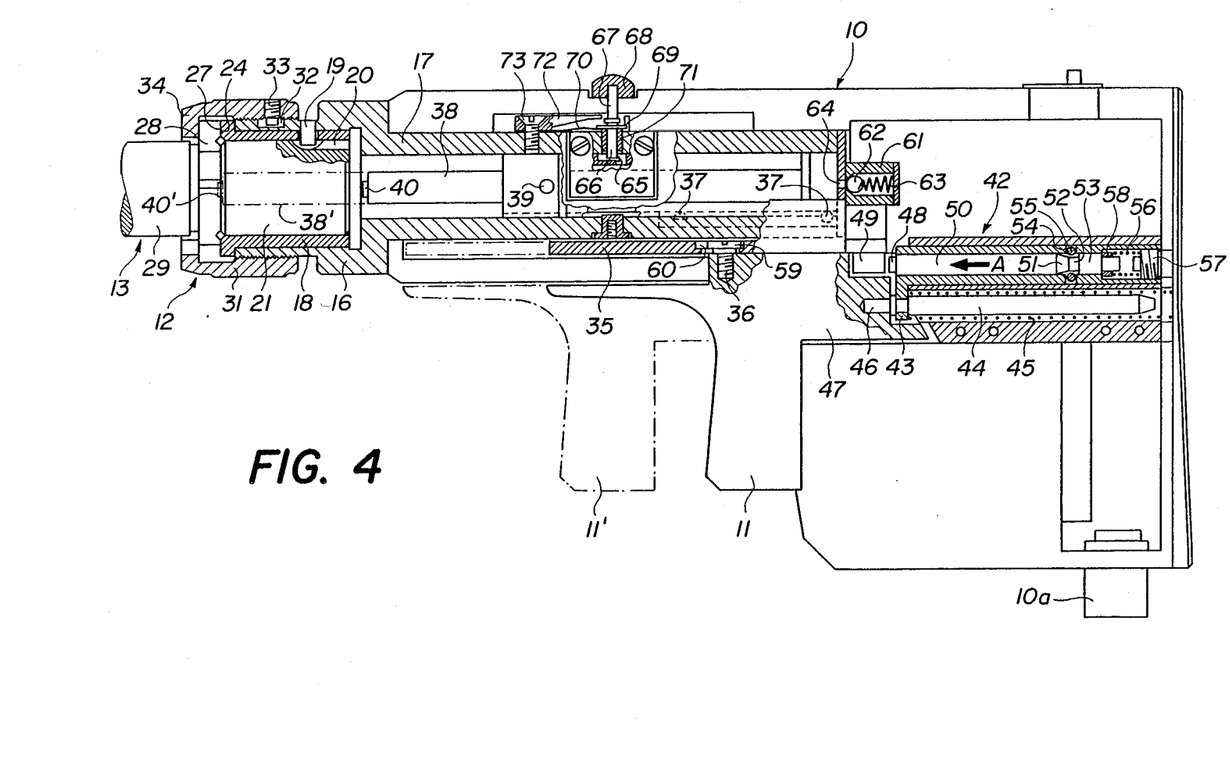
FIG. 4 represents an axial sectional view of the micrometer of FIG. 1.

With reference to the figures, the micrometer, represented respectively in a plan view in FIG. 1 and partially in axial section in FIG. 4, includes a pistol-shaped body 10 containing all the mechanical and electronic elements allowing to effect the measurements provided for, and equipped with a control trigger 11, with a head for fixing a measuring piece 13 intended for measuring inner diameters of a cavity or a bore, with a display screen 14 and with a block of function keys 15. Among the function keys, one will essentially note the zero setting, the memorization of the maximum and the conversion of metric values into inches. The revolver handle contains cells or batteries (not shown). A plug 10a allows connection to a printer. The electronic circuit (not shown) is accomodated in the body of the apparatus, essentially in the rear part of this body.

The fixing head 12 essentially comprises a cylindrical element 16 disposed at the end of an elongated barrel 17. This element and this barrel are preferably made of bronze and contain an inner sleeve 18 of steel or another particularly hard material. This sleeve is made solid with the cylindrical element 16 by fitting. The fixed pin 19 passes through the inner sleeve 18 and is engaged in a groove 20 of the measuring piece 13 accomodated in the fixing head 12. This pin 19 functions as a set pin.

Figure 2:
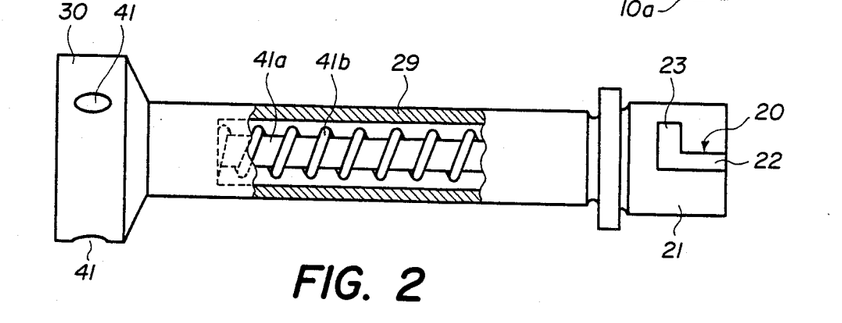
FIG. 2 represents a plan view in partial axial section of a measuring piece adapted to measure inner diameters of a bore.

The measuring piece 13, shown in plan view in FIG. 2, includes a hollow cylindrical end piece 21 preferably provided with a groove 20 which cooperates with the pin 19 to form a coupling of the bayonet type. To this end, (see FIG. 2), the groove 20 is composed of a rectilinear section 22 in axial direction connected at its front end to a peripheral slot 23. The fastening of the measuring piece in the inner sleeve 18 is effected in the following manner: the operator engages the hollow cylindrical end piece 21 in the inner sleeve 18 so that the rectilinear section 22 of the groove 20 coincides with the pin 19, then makes this end piece undergo a slight rotation bringing the pin into the peripheral slot 23. This rotational movement, ensuring the bayonet-type coupling of the hollow cylindrical end piece 21 in the inner sleeve 18, also has another function which will be described in more detail below.

Figure 5:
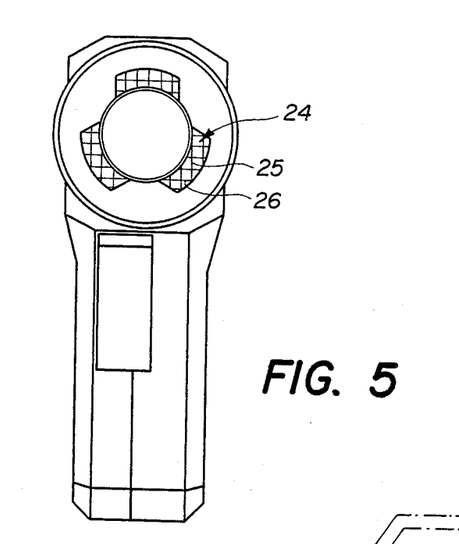
FIG. 5 represents a front view of the micrometer according to FIG. 1.

The front end of the inner sleeve 18 defines a surface plate 24 represented by the front view of FIG. 5. This surface plate is made of hardened steel or of another particularly hard surface, and comprises two series of serrations 25 and 26 which are respectively parallel to two diameters perpendicular to each other. This surface plate 24 serves as a reference surface for a support surface 27 solid with the measuring piece 13. The different serrations have the object of evacuating fine particles or dust (which could possibly vitiate the measurements), at the moment when the bayonet-type coupling causes a relative rotation of the support surface 27 on the surface plate 24. This support surface 27 is in fact defined by three ribs 28 provided between the hollow cylindrical end piece 21 and a rod 29 carrying a measuring head 30. A clamping nut 31 is mounted coaxially with the cylindrical element 16 and the inner sleeve 18. A groove 32 is provided on a part of the periphery of the cylindrical element 16. A pin 33 solid with the nut 31 is engaged in the groove 32 to limit its rotation when loosening.

The front end of the nut is provided with three ribs 34 adapted to be brought into superposition on the ribs 28 of the measuring piece and to ensure locking of the latter in the fixing head 12, when the clamping nut is locked by a rotation producing its axial displacement by means of its threading.

The drive mechanism of the micrometer includes the trigger 11 made solid with a sliding carriage 35 by means of a pin 36. This carriage, represented partially in full lines and partially in broken lines, slides on guide roller bearings 37 when the trigger passes from its position 11', represented in dash-dotted lines, to its position 11 represented in full lines.

The carriage 35 carries a piston 38 which is connected to this carriage by a fixed pin 39 or by any other appropriate connecting means. The front end of the piston carries a support stop 40, adapted to bear upon an axial rod 41a accomodated within the measuring piece to govern the extension of the feelers 41 (see FIG. 2) which bear upon the inner walls of a cavity, for example the cylindrical surface of a bore to measure the inner diameter. A spring 41b surrounds the rod 41a and maintains it in its retracted position represented in FIG. 2. The piston may assume a retracted position 38 represented in full lines or a thrust position 38' represented in dash-dotted lines. The support stop 40 then occupies the position 40'.

The micrometer as represented in the FIGS. 1 and 4, is provided for example for measuring the internal diameter of a bore. The measuring piece is inserted into the bore up to the measuring zone. When this zone is reached, the operator must cause the extension of the retractable feelers 41 which bear in three points upon the internal wall surface of the bore of which the diameter is to be measured. The radial displacement of the feelers 41 is, as will be described in more detail further on, linked to the displacement of a rod accomodated within the measuring piece. This rod is itself pushed by the piston 38 which is connected to the carriage 35 whose displacement is governed by a drive mechanism 42.

This drive mechanism consists of a slide 43 carrying a central rod 44 for guiding a pressure spring 45. This guiding rod is extended by a pusher 46 which is engaged in an appropriate bore of a block 47 solid with the trigger 11.

The role of the pressure spring 45 consists in exerting a thrust upon the piston 38 via the carriage 35 in order to effect the extension of the retractable feelers 41. The bearing force acting upon the carriage and consequently on the piston is exerted via the pusher 46.

This drive mechanism is associated with a mechanism for braking or positioned locking comprising a support stop 48 adapted to cooperate with a block 49 solid with the rear end of the carriage 35. The support stop 48 consists of the end of a rod 50 designed to slide within a cylindrical bore provided in the slide 43. This rod 50 includes a conical section 51 extended by a cylindrical section 52 of constricted cross-section, itself extended by a section 53 whose cross-section corresponds to the cross-section of the front part of the rod. The two sections 51 and 52 define a peripheral groove disposed facing a series of orifices 54, situated on the same generating line, provided in the body of the slide 43 around the rod 50, and containing small balls 55. A relieving spring 56, whose thrust may be adjusted by means of a cap 57 screwed at the end of the bore containing the rod 50, bears upon a ring 58, resting upon an appropriate shoulder provided at the end of the rod 50 and tends to push this rod in the direction of the arrow A. In the absence of other stresses, the relieving spring 56 tends to push the rod 50 so that the support stop 48 bears upon the opposite surface of the block 49.

One of the principal functions of the brake mechanism consists in maintaining the feelers momentarily in their maximum opening position. Accessorily, this brake mechanism facilitates centering the device at the time of measurement. As is shown in FIG. 4, the pin 36 is connected to a support 59 solid with the carriage. This support is disposed in a recess 60 whose axial dimension is slightly greater than that of the support 59 so that the trigger 11, which is made solid with the pin 36, may be displaced with a certain play with respect to the carriage 35. Due to this play, when the operator presses upon the trigger, the support 59 of the pin 36 is displaced towards the rear of the recess 60 to take up said play before driving the carriage 35 backwards. In this position, the pressure spring 45 urges the slide 43 to bear upon the block 47 linked to the trigger. Given that the relieving spring 56 repels the rod 50 in the direction of the arrow A, the brake mechanism with balls 55 is freed, which allows displacement of the slide 43 in the opposite direction to that indicated by the arrow A and the compresssion of the pressure spring 45.

The brake mechanism does not come into action unless the thrust tending to push back the carriage in the direction opposite to the arrow A is produced by an action upon the feelers, without the operator acting upon the trigger. The latter being subjected to the action of the pressure spring 45, the support 59 lies resting against the front face of the recess 60. In this case, the stop 48 lies resting against the block 49 due to the action of the spring 56. Any displacement of the piston 38 resulting from a direct action on the feelers tends to produce a recoil of the the rod 50. In consequence of this recoil, the conical section 51 locks the balls 55 in the series of orifices 54 provided in the bore of the slide 43 of said rod 50, which leads to locking of this rod. Consequently, this brake mechanism constitutes an antirecoil device which allows in practice to facilitate the positioning of the instrument and to facilitate the search for the maximum value of the measurement.

The search for the maximum and the display of the corresponding value may be obtained by the electronic circuit. In this case, the brake mechanism will no longer be of interest for this function, but will retain its full utility to facilitate the work of the user by permitting to make easier the search for a stable position during the measurement.

A pneumatic damping device with controlled leakage, provided at the end of the cavity containing the piston 38, comprises a chamber 61 containing a ball valve 62 pressed by a spring 63 against an opening 64. Through the leakage effect, the forward displacements of the piston 38 may be dampened.

Another essential feature of the described micrometer resides in the existence of a calibrating stop 65 solid with the piston 38. This calibrating stop of hard metal cooperates with a mobile stop 66 mounted on the body of the apparatus. The stop 66, consisting of a cylindrical pin 67 carrying a control button 68 at its upper end and an annular washer 69 which cooperates with a blade spring 70 tending to upwardly repel the pin 67, is accomodated in a cylindrical sleeve 71, in such manner that it may slide in this sleeve between a low position and a high position. In the low position, the lower end of the pin 67 constitutes a reference stop 66 upon which the calibrating stop 65 rests thus allowing the initial position of the piston 38 to be defined with precision. A stop 72, fixed by a screw 73 to the body 17 of the apparatus, prevents accidental exit of the pin 67.

Given that the distance between the reference stop 66 and the surface of the surface plate 24 is perfectly known, one may, thanks to these two fundamental elements, define a zero point of the travel of the piston, whatever the measuring piece adapted to the micrometer may be. The position of the rod contained within this measuring unit and whose end cooperates with the stop 40 of the piston 38 is defined in such manner that the effective displacement of the piston 38 from the zero position defined by these reference and calibrating stops 66 and 65, is automatically compensated for the value displayed on the screen to correspond to the real dimension of the measured part. Thanks to this system, one may effect direct readings, without resorting the reference rings and without effecting any compensating calculation, whatever the measuring piece adapted to the end of the micrometer may be. As a result, a great ease of measurement is achieved, although the user may very often have to modify the measuring piece given that to cover a relatively large range of values, one is obliged to dispose of a very large range of measuring pieces corresponding to a well dettermined zone of measurement. By way of example, the measuring pieces designed to measure bore diameters, which permit a measurement to be effected whose precision is of the order of one micron, each have a measuring range of 25 mm.

In practice, to carry out a measurement of the diameter of a bore, the operator adapts the measuring piece whose measuring range corresponds to the diameter to be measured. He then effects the calibration of the device by pressing on the trigger to bring the piston into the position which permits setting the reference stop 66 in place, by pressing on the control button 68. He releases the trigger to bring the calibrating stop 65 to bear upon the reference stop 66 and presses on a key for zero setting of the electronic circuit and the display device. Renewed pressing of the trigger releases the mobile pin 67 due to the effect of the spring 70. The spring 45 then drives back the trigger, the carriage and the piston to their working position. The piston 38 acts upon the drive rod of the feelers up to the moment when the latter are in contact with the internal wall surface of the bore. Display of the maximum dimension is effected automatically by memorization of the maximum value. The brake mechanism, which acts as an antirecoil device, facilitates the search for the maximum diameter.

Figure 3:
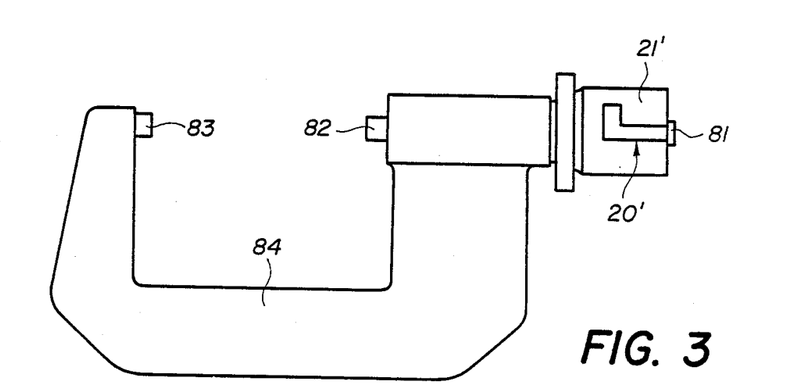
FIG. 3 represents a measuring piece of the vernier type adapted to measure outer dimensions.

FIG. 3 schematically illustrates a measuring piece allowing the measurement of the outer dimensions of parts. This piece includes as does that represented in FIG. 2, a hollow cylindrical end piece 21' provided with a groove 20' forming a bayonet-type coupling. A bearing stop 81 disposed at the end of an axial rod (not shown) is intended to cooperate with the stop 40 disposed at the end of the piston 38 to displace a feeler 82. The measurement is carried out between a fixed stop 83 mounted on a leg of the U-shaped body 84 of the measuring piece and the feeler 82.

Figure 6:
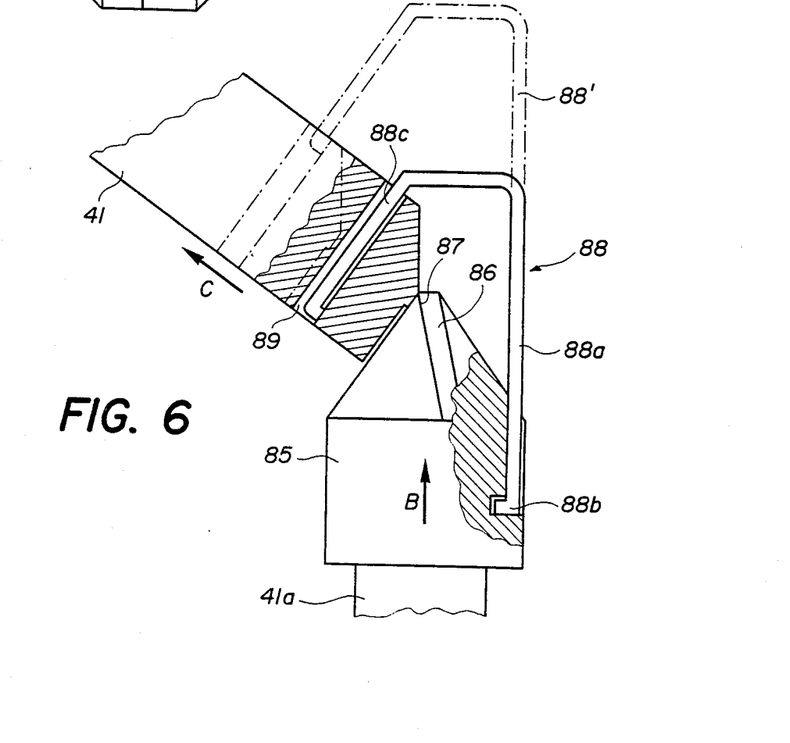
FIG. 6 represents a partial sectional view of a measuring piece for measuring internal diameters as shown in FIG. 2.

FIG. 6 represents a partial sectional view of the measuring piece of FIG. 2. The end of the rod 41a carries a conical head 85 against which bear three feelers 41 disposed in a star-shaped arrangement. The conical head, by its axial displacement in the direction of the arrow B, causes the advance of the feelers 41 in the direction of the arrow C. In order that this displacement may be effected with minimum wear of the surfaces of contact with each other, the conical head includes three plane millings 86 on which respectively bear the three likewise plane dog points 87, which in fact constitute the support surfaces of the feelers. In conventional systems, the ends of the feelers bear upon the conical surface of the conical head. Given that the support surface has very reduced dimensions, which may be likened almost to points, the wear is relatively rapid, which results in vitiating the measurements and decreasing the precision of the apparatus. The fact of disposing of plane support surfaces of relatively large dimensions considerably reduces wear.

To ensure the return movement of the feelers 41, the latter are respectively connected to the conical head 85 by a spring 88 of which one of the branches 88a is attached by a claw 88b accomodated in an appropriate cavity in this head. Another branch 88c of this spring is engaged in a diametral bore 89 provided through the feeler.

When the conical head 85 is displaced in the direction of the arrow B, the feelers 41 are displaced in the direction of the arrow C. During this displacement, the arm 88c of the spring is displaced to a position 88' represented in broken lines, while maintaining the support surface of the dog points 87 against the corresponding plane millings 86. After the measurement, the conical head 85 is withdrawn in the direction opposed to the arrow B, which results in permitting the retraction of the feelers. This retraction is obtained thanks to the return movement effected by the arm 88c of the spring 88.

The spring 88 is represented partially. In practice, it consists of a single piece including three arms 88a each provided with a claw 88b and three arms 88c each accomodated in a bore 89 of one of the feelers 41.

Figure 7:
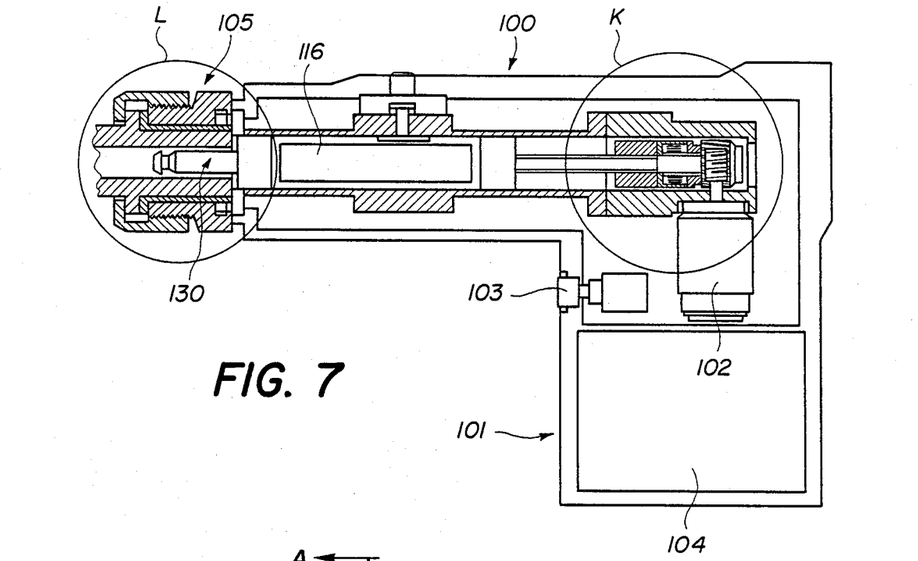
FIG. 7 represents an axial sectional view of another embodiment of the micrometer according to the invention.

With reference to FIG. 7, the represented micrometer includes as previously a pistol-shaped body 100 containing all of the necessary mechanical and electronic elements. This body comprises a handle 101 containing an electric motor 102 and equipped with a control button 103 connected to electric cells or batteries accomodated in an appropriate chamber 104 provided in the handle 101. At the front end of this body a head 105 is mounted for fixing a measuring piece 106 (see FIG. 10).

Figure 8:
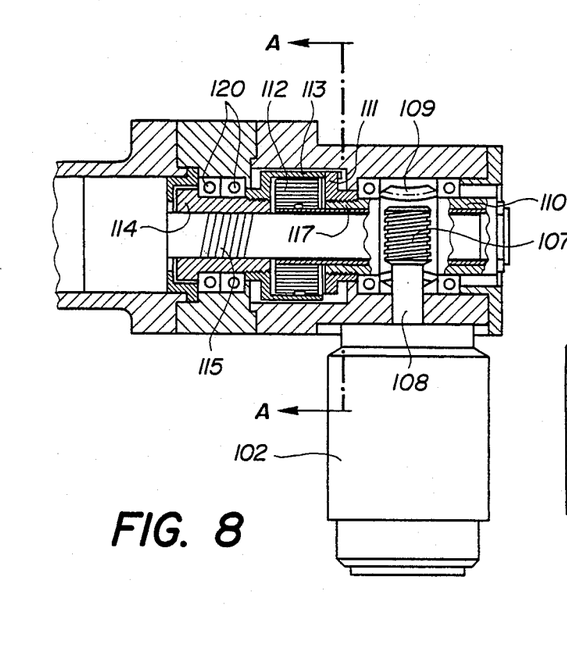
FIG. 8 represents an enlarged axial sectional view of a detail of the device of FIG. 4.

The control mechanism of the micrometer is represented in greater detail with reference to FIG. 8 which corresponds to the part surrounded by a circle K in FIG. 7. This mechanism includes an endless screw 107 mounted on the drive shaft 108 of the electric motor 102, and which meshes with a helicoidal wheel 109. This helicoidal wheel 109 is solid with a spindle 110 substantially perpendicular to the drive shaft 102. The spindle 110 carries a driver 111 consisting of a tubular part to which a barrel spring 112 is attached. The housing 113 of the barrel spring 112 is directly fixed to a nut 114 screwed onto a threaded rod 115 extending the piston 116 (see FIG. 7) identical with the piston 38 descibed with reference to FIG. 4.

Figure 9:
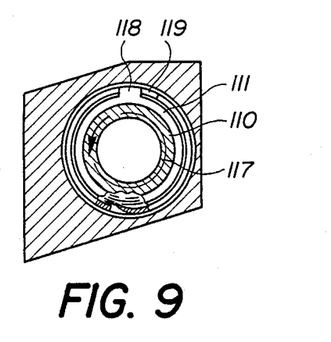
FIG. 9 represents a cross-sectional view of the micrometer of FIG. 9 along the line A—A of this figure.

FIG. 9 shows the relative positions of the spindle 110, the driver 111 and an adjuster 117 which is in fact a tube section solid with the spindle 110 and mounted coaxially therewith, and to which the barrel spring 112 is attached.

When the operator wishes to carry out a measurement, he actuates the control button 103, which leads to driving the spindle 110, the adjuster 117 and the driver 111. The barrel housing is brought back to abut upon the driver which includes for this purpose a protuberant dog point 118 engaged in an appropriate recess 119 of the barrel housing. Rotation of the spindle 110 finally leads to rotation of the nut 114 mounted on a ball bearing 120, which leads to axial displacement of the threaded rod 114 to which the piston 116 is fixed.

When the piston, or more exactly the retractable feelers 41, arrive in abutment for measurement, the motor which continues to rotate drives one of the ends of the barrel spring, the other being locked. This leads to loading of the spring. When the intensity of the motor feed current attains a certain predetermined threshold, the electronic circuit ensures cut-off of this current feed. The spring being loaded, if the original positioning of the feelers is not ideal, that is, if the measuring piece was not perfectly centered, the operator slightly moves the micrometer body, which leads to displacement of the feelers by a slight distance, sufficient however to bring them, due to the force stored by the spring, to the desired position. It has been found, during numerous tests, that the measurements could be carried out by quite inexperienced operators and that the results found in numerous measurements carried out by different persons were almost identical. The control mechanism is of the type with power reserve and allows a precise measurement in any condition.

Figure 10:
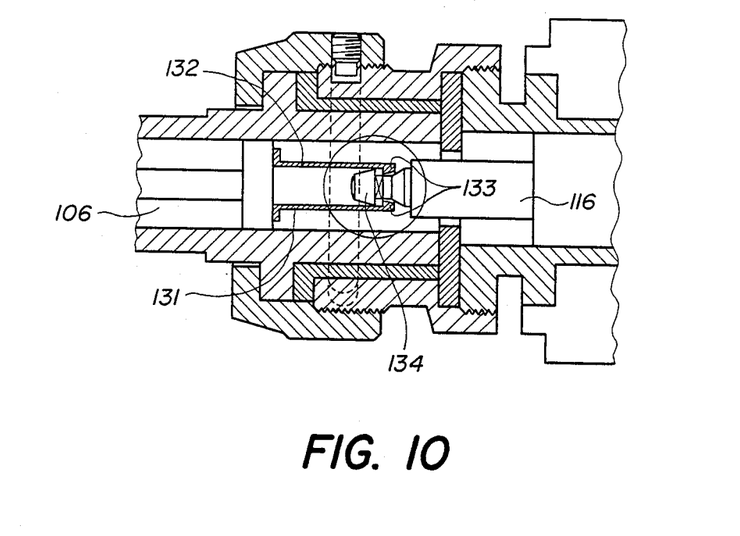
FIG. 10 represents an axial sectional view of the fastening element of a measuring piece.
Figure 11:
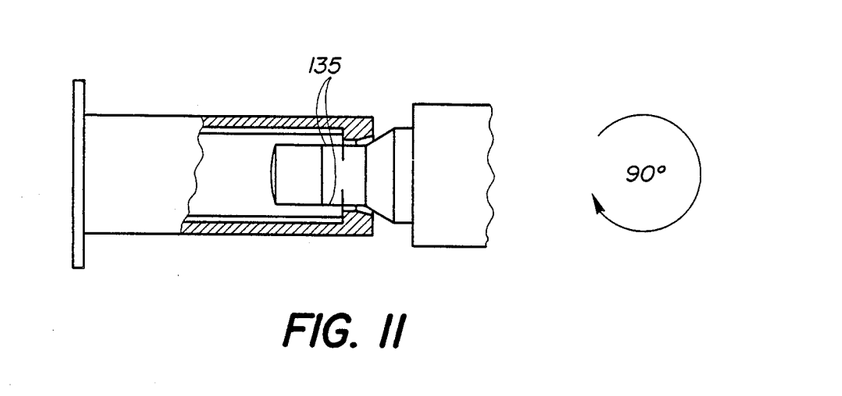
FIG. 11 represents an enlarged view of this fastening element rotated by 90° around its axis with respect to its position in FIG. 10.

In the example of the embodiment illustrated in FIG. 6, the return movement of the feelers is effected by means of a spring 88. In the variant illustrated in FIG. 7, the feelers are brought back by a latching device 130 which is illustrated in FIGS. 10 and 11 and is described in greater detail with reference to these figures. FIG. 10 is an enlarged view of the contents of the circle L in FIG. 7. The measuring piece 106 is equipped with a part 131 consisting of two fingers 132 whose end is equipped with a protuberance 133. The piston 116 is provided with a protuberant head 134 provided with two flat parallel surfaces 135 which allow this head to be engaged in these two fingers 132 or to be withdrawn therefrom after a rotation of 90° with respect to the position shown in FIG. 10. This position is represented in FIG. 11. This protuberant head and this part constitute removable coupling elements allowing coupling between the piston and the measuring piece. The return movement of this piece is thus ensured, the return springs being done away with.

The present invention is not limited to the described embodiments, but may undergo various modifications and have different variants obvious to a person skilled in the art.

We claim:

1. Micrometer including a body containing means for displaying the results of measurements, said body being equipped with a cylindrical head, a measuring piece detachably mounted on said head and adapted for the measurement of either the outer dimensions of a surface, or of the inner dimensions of a cavity or of depths, and means attached to said head for effecting measurements in natural size and for displaying a value corresponding to the real dimension of the measured object, wherein said means for effecting measurements comprise a surface plate secured to said head and serving as a reference surface designed to constitute a fixed support for said measuring piece, said head being solid with said body, said surface plate having two series of serrations respectively parallel to two mutually perpendicular diameters of said head.

2. Micrometer according to claim 1, including a fastening device of the bayonet type for fastening said measuring piece to said head.

3. Micrometer according to claim 1, wherein said means for effecting measurements comprise a calibrating stop solid with a mobile piston, said piston being adapted to push back a drive rod for measuring feelers of a measuring piece, and a reference stop, these two stops being positioned in such a manner that they determine with great precision the origin of any displacement of said piston.

4. Micrometer according to claim 3, wherein the distance between said surface plate and said reference stop is defined with a precision of the order of 1 micron.

5. Micrometer according to claim 3, wherein said measuring piece includes a drive rod having an end which is adapted to come into contact with a bearing stop solid with the free end of said mobile piston and is positioned at a determined distance from said calibrating stop, when the measuring piece is in place on said surface plate, this distance being defined for each measuring piece in such a manner that the displacement effected by the piston from its initial position defined by its calibrating stop to its final position, corresponds to the dimension to be measured.

6. Micrometer according to claim 3, wherein said reference stop is mobile and includes a pin sliding in a fixed sleeve having a control button adapted to bring said pin into a depressed position in which it serves as a support for said calibrating stop, and a return spring tending to bring said pin back into its initial position.

7. Micrometer according to claim 3, wherein said mobile piston is solid with a mobile carriage connected to a spring drive mechanism adapted to produce displacement of said carraige.

8. Micrometer according to claim 7, wherein said mechanism includes a slide, a pressure spring adapted to produce displacement of said slide, a stop engaged in a block solid with a trigger, said trigger being solid with said carriage, and a brake mechanism associated with said drive mechanism adapted to constitute an antirecoil device.

9. Micrometer according to claim 8, wherein said brake mechanism includes a cylindrical rod provided with a conical section extended by a cylindrical section of constricted cross-section, forming a peripheral groove, and disposed facing a series of orifices of a sleeve surrounding said cylindrical rod, said orifices containing small balls, whereby said cylindrical rod may be axially displaced within the sleeve due to the action of a spring toward a position wherein the balls are free and in the opposite direction by said carriage toward a position wherein the balls are locked by said conical section.

10. Micrometer according to claim 3, wherein said mobile piston is extended by a threaded rod, said rod being associated with a drive mechanism with power reserve adapted to axially displace said rod.

11. Micrometer according to claim 10, wherein said drive mechanism with power reserve includes an electric motor, a barrel spring, mechanical means for coupling said threaded rod to said elecric motor via said barrel spring, means for loading said spring and means for restituting to said threaded rod the power stored by said spring.

12. Micrometer according to claim 11, wherein said mechanical means for coupling said threaded rod with said motor, said means for loading said spring and said means for restituting the stored power comprise a hollow spindle rotatably driven by a helicoidal wheel which meshes with an endless screw solid with a drive shaft of said motor, an adjuster coaxial with said hollow spindle, a barrel housing and a rotary nut screwed onto said threaded rod, and further comprise a driver solid and coaxial with said hollow spindle and adapted to be made solid with the housing of said spring, said spring being fixed at one end to said adjuster and at its other end to said driver.

* * * * *